Figure 1:
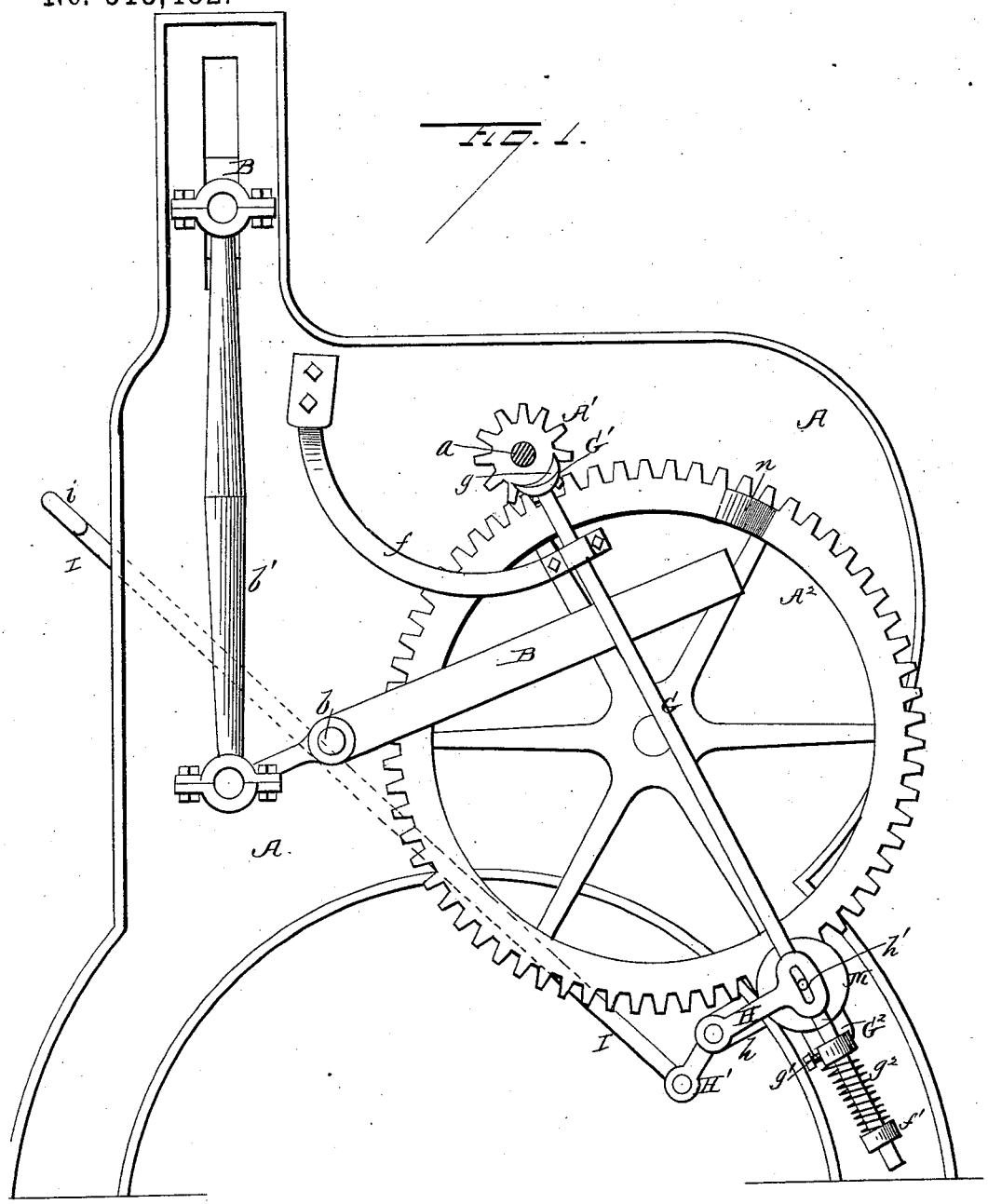

(No Model.) 2 Sheets—Sheet 1.

E. P. DONNELL.
CLUTCH FOR PAPER CUTTING MACHINES.

No. 313,482. Patented Mar. 10, 1885.

Witnesses:
H. C. McArthur
Chas. Kressmann

Inventor.
Edward P. Donnell
per
H. Harrison
Attorney.

(No Model.) 2 Sheets—Sheet 2.
E. P. DONNELL.
CLUTCH FOR PAPER CUTTING MACHINES.
No. 313,482. Patented Mar. 10, 1885.
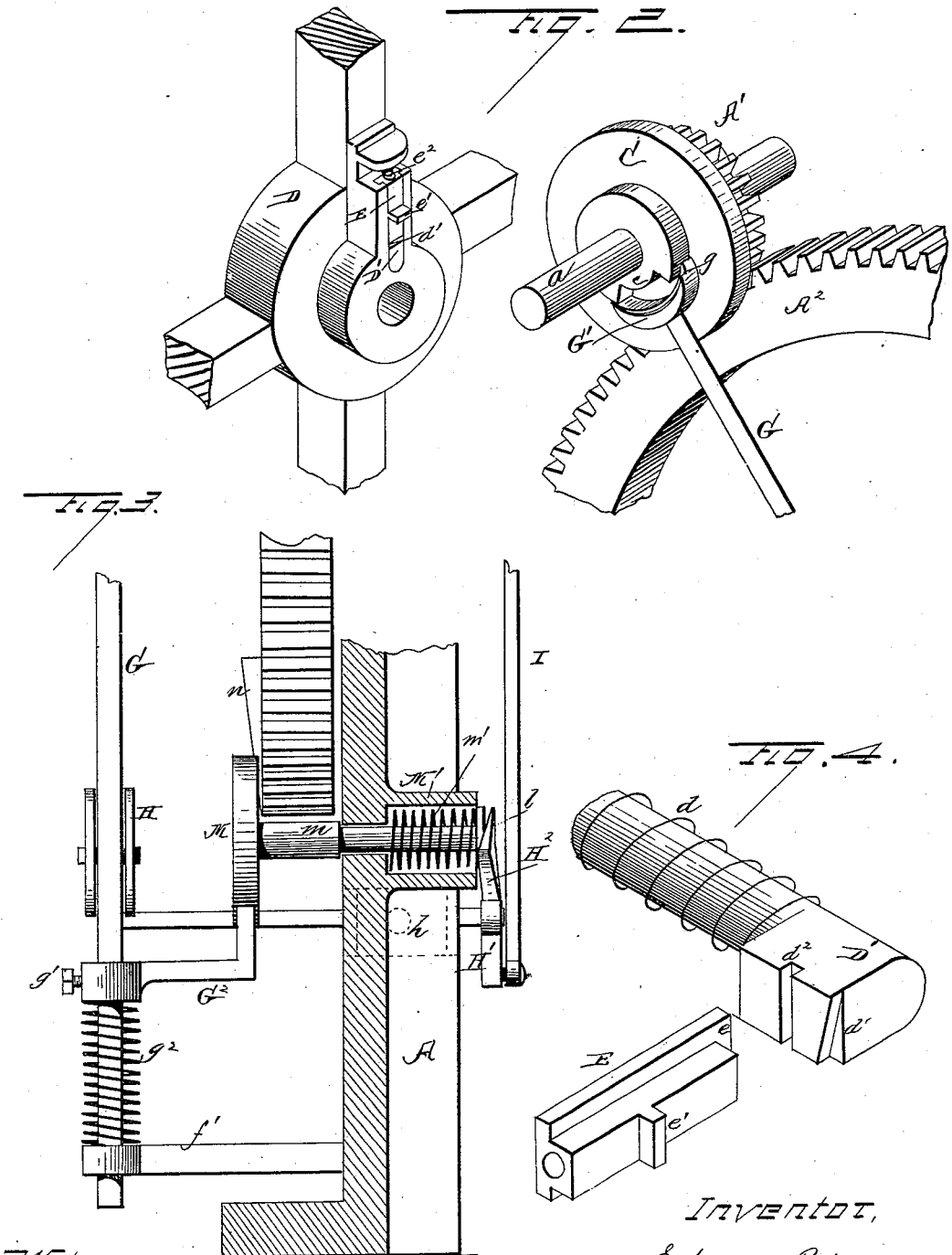

UNITED STATES PATENT OFFICE.

EDWARD P. DONNELL, OF CHICAGO, ILLINOIS.

CLUTCH FOR PAPER-CUTTING MACHINES.

SPECIFICATION forming part of Letters Patent No. 313,482, dated March 10, 1885.

Application filed August 5, 1884. (No model.)

*To all whom it may concern:*

Be it known that I, EDWARD P. DONNELL, a citizen of the United States, residing at Chicago, in the county of Cook and State of Illinois, have invented certain new and useful Improvements in Clutches for Paper-Cutting Machines, of which the following is a specification, to wit:

This invention relates to paper-cutting machines; and it consists in the peculiar construction and arrangement of a clutch adapted to connect and disconnect the main driving gear or pinion with the belt-pulley, which runs loose upon the shaft, substantially as and for the purpose set forth hereinafter, and more particulary pointed out in the claims.

In order to enable others skilled in the art to which my invention appertains to make and use the same, I will now proceed to describe its construction and operation, referring to the accompanying drawings, in which—

Figure 1 is a side view of a paper-cutting machine with the belt-pulley removed and my clutch mechanism in position for use. Fig. 2 is a perspective view of a part of the main shaft and its fixed disk and driving-pinion, and the hub of the driving-pulley alongside. Fig. 3 is a section taken vertically through the lower part of the main frame, and representing the devices for automatically stopping the machine; and Fig. 4 represents detail perspective views of the clutch-bolt and its securing-latch.

A represents the main frame of a paper-cutting machine of any of the usual and well-known forms, having a driving-shaft, $a$, provided with a pinion, A', meshing with and giving motion to a large gear-wheel, A², pivoted upon the main frame, and giving motion to a lever, B, fulcrumed at $b$, the shorter arm of which is by a pitman, $b'$, connected with the knife bar or head B' in any of the usual ways. This part of the device being common, and only here shown to explain and connect the operation of the present improvements, it is not here necessary to give a more detailed illustration and description of the same.

In using steam-power in the operation of a machine of this kind, it is necessary that the machine should be under complete control, easily and quickly clutched to the constantly-revolving driving-pulley, and after one complete stroke of the knife should be automatically disengaged from said pulley when the knife is returned to its highest point; and to this end I provide the main driving-shaft $a$ with a fixed disk, C, having a notched edge, $c$, (as clearly seen in Fig. 2,) for engagement with the bolt of the clutch, as presently explained. I also place upon the driving-shaft a loose belt-pulley, which, being generally of ordinary construction, I have only shown the hub and some of the spokes, as at D in Fig. 2. In a transverse recess of this hub I place a bolt, D', having its shank provided with a spring, $d$, which tends to press the bolt outward. The head or outer end of the bolt D' is formed on its edge with a beveled notch, $d'$, and just in rear of this with a groove, $d^2$, across the side of the head, as clearly shown in Fig. 4.

In a suitable slot of the hub, at right angles to the bolt, is a catch or slide, E, the point $e$ of which is of such size as to fit into the groove $d^2$ of the bolt-head, and the catch is also formed with a lug, $e'$, projecting beyond the face of the hub, as in Figs. 2 and 4. Behind this catch or slide is a spring, $e^2$, which acts to force it forward into contact with the bolt.

In suitable lugs or guide-pieces, $f f'$, upon the outer side of the main frame, is placed a sliding rod, G, upon the upper end of which is a crescent-shaped shoe, G', which lies close to the notched disk fixed upon the main shaft and between it and the loose belt-pulley, as in Figs. 1 and 2. This shoe has upon its upper edge, adjacent to the pulley, a beveled notch or incline, $g$, which at proper times engages the similarly-notched bolt of the clutch to force the latter back, as hereinafter explained. The lower part of the rod G is provided with an L-shaped arm, G², adjustable upon the rod by means of a set-screw, $g'$. Upon the rod, below this arm, is a spring, $g^2$, which rests against the lower guide-lug in which the rod is held, and serves to always return the latter to its normal place after being released. The rod is drawn down by means of a lever-arm, H, pivoted in suitable offsets, $h$, of the main frame, and to the other end of its pivot is secured an oppositely-extending arm, H', to which is connected a rod, I, extending up to the front of the machine to within easy reach of the operator, where it is provided with a hand-hold, $i$, as in Fig. 1. To prevent any slight and accidental movement of the rod I from throwing the machine into motion, I provide the lever-arm H with slots $h'$ at its point of attachment to the rod G, and thus prevent any movement of this rod by a slight one of the pull I, as will be readily understood. Beside the sliding rod H in the lower part of the frame is a disk, M, having a shank or spindle, $m$, sliding in a socket or guide, M', of the main frame, and provided with a spring, $m'$, to retract it, as in Figs. 1 and 3. The outer face of the large gear $A^2$, which runs behind the disk M, is provided with a cam-projection, $n$, which at the proper time forces the disk outward and allows the L-shaped arm on the rod G to spring up behind it to hold it there.

In operation, when the work is properly adjusted the operator by pulling the rod I draws down the rod G, with its L-shaped arm $G^2$, which allows the disk M to spring in, and the arm contacts with its edge and is held back. When the rod G is drawn back, its shoe strikes the lug $e'$, and draws back the sliding catch E to release the bolt, which springs forward into the notched disk, and locks the main shaft and belt-pulley together. The machine is thus started, and when the large gear has made one full revolution and the knife rises again to its highest point the cam-piece $n$ on said gear, passing behind the disk M, forces it outward, and allows the rod G to spring upward, its shoe G' then engaging the inclined or beveled notch on the bolt, and forcing it back till it is released from the notched disk, when the catch springs forward and holds it so, and the machine stops till the operator again pulls the handle to start it. The stopping of the machine is thus automatically accomplished at a particular point, and the machine is brought under perfect control.

To provide for stopping the machine at any intermediate point desired, I provide the small rock-lever H with an arm, $H^2$, the end of which is formed with an inclined or cam projection, $l$, resting in rear of the shank of the disk M, as in Fig. 3. The machine being started, as described, by pulling upon the rod I, the disk is drawn back to engage and hold the stop-arm $G^2$ while the machine is in motion, and should it be necessary to stop the machine before the automatic action for this purpose, it is only necessary to push down upon the rod I, which throws up the arm $H^2$, and its inclined end, contacting with the shank of the spring-disk, forces the latter forward, and at once releases the rod G, which springs upward to engage and throw back the bolt, and the machine is at once stopped. This enables the operator to keep his machine under complete control and stop it at any time that may be necessary.

Having thus fully described my invention, what I claim as new, and desire to secure by Letters Patent, is—

1. In a paper-cutting machine, a main driving-shaft provided with a notched disk secured upon it, in combination with a loose driving-pulley having its hub provided with a spring-bolt engaging said disk, and a spring-catch in the hub engaging the bolt, to hold it when drawn back, substantially as and for the purpose set forth.

2. In a paper-cutting machine, a main driving-shaft provided with a fixed notched disk and a loose driving-pulley, the latter having a spring-bolt for engaging the disk and a spring-catch for engaging the bolt, in combination with a sliding rod provided with a crescent-shaped shoe engaging and forcing back the catch when slid in one direction and the bolt in the opposite direction, substantially as and for the purpose set forth.

3. In a paper-cutting machine, a loose belt-pulley provided with a clutch-bolt for engaging and disengaging it with the driving-shaft, the large knife-operating gear having a cam upon its edge, and a clutch-operating rod sliding in guides upon the frame, and having a spring and an adjustable L-shaped arm upon its lower end, in combination with a disk having a spring-actuated shank socketed in the main frame and lying in close proximity to the face of said gear and in contact with the arm of the sliding rod, and an operating-rod connected to the first rod by a rocking lever, substantially as and for the purpose set forth.

4. The main frame A, driving-shaft $a$, having a pinion, A', and a fixed disk, C, with notch $c$, and the large gear $A^2$, having a cam, $n$, in combination with the pulley D having a spring-bolt, D', formed with groove $d^2$ and beveled notch $d'$, and a spring-catch, E, with projecting lug $e$, the spring-actuated rod G, having on its upper end a crescent-shaped shoe, G', formed with beveled notch $g$, and on its lower part an L-shaped arm, $G^2$, a spring-actuated disk, M, acting as a stop to hold the rod G in position, a rocking lever, H H', connected to said rod by slotted connections, and a rod, I, lying in convenient reach of the operator, substantially as and for the purpose shown and described.

5. In a paper-cutting machine, a spring-stop upon the main frame to engage and hold the clutch-operating rod during the action of the machine, in combination with a starting-rod connected with the clutch-rod, and provided with a cam or incline contacting with the spring-stop, whereby the movement of the operating-rod in one direction will withdraw the clutch-rod and engage it with the spring-stop, and the movement in the other direction will throw out the stop to release the clutch, substantially as and for the purpose set forth.

In testimony whereof I affix my signature in presence of two witnesses.

EDWARD P. DONNELL.

Witnesses:
W. C. McARTHUR,
CHAS. KRESSMANN.